(12) United States Patent
Kondo et al.

(10) Patent No.: US 8,818,306 B2
(45) Date of Patent: Aug. 26, 2014

(54) WIRELESS COMMUNICATION DEVICE

(75) Inventors: Toshinori Kondo, Osaka (JP); Hiroyuki Takebe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/876,575

(22) PCT Filed: Dec. 19, 2011

(86) PCT No.: PCT/JP2011/079292
§ 371 (c)(1),
(2), (4) Date: Apr. 23, 2013

(87) PCT Pub. No.: WO2012/086566
PCT Pub. Date: Jun. 28, 2012

(65) Prior Publication Data
US 2013/0210377 A1  Aug. 15, 2013

(30) Foreign Application Priority Data

Dec. 22, 2010  (JP) .................... 2010-286380

(51) Int. Cl.
*H04B 17/02* (2006.01)
*H04B 1/10* (2006.01)
*H04B 7/08* (2006.01)
*H04B 1/12* (2006.01)
*H04B 1/18* (2006.01)

(52) U.S. Cl.
CPC ............ *H04B 1/1027* (2013.01); *H04B 7/0842* (2013.01); *H04B 1/126* (2013.01)

USPC ............................................ 455/137; 455/273

(58) Field of Classification Search
CPC ...................................................... H07B 7/0857
USPC .............................. 455/137, 139, 273, 278.1
See application file for complete search history.

(56) References Cited

U.S. PATENT DOCUMENTS

| 2,860,238 | A | * | 11/1958 | Dyke et al. ..................... 455/275 |
| 6,128,355 | A | * | 10/2000 | Backman et al. ............. 375/347 |
| 2010/0007742 | A1 | | 1/2010 | Satoh et al. |
| 2010/0190461 | A1 | | 7/2010 | Ejima |
| 2011/0051866 | A1 | | 3/2011 | Nadamoto et al. |

FOREIGN PATENT DOCUMENTS

| JP | 2003-18074 A | 1/2003 |
| JP | 2005-252533 A | 9/2005 |
| JP | 2010-21682 A | 1/2010 |
| JP | 2010-118880 A | 5/2010 |
| WO | WO 2009/128221 A1 | 10/2009 |
| WO | WO 2009/136494 A1 | 11/2009 |

* cited by examiner

*Primary Examiner* — Lee Nguyen
(74) *Attorney, Agent, or Firm* — Birch, Stewart, Kolasch & Birch, LLP

(57) ABSTRACT

A wireless communication device (100) carries out diversity reception and a noise cancellation process, and a signal combining section (combining circuit (123)) combines a plurality of received signals in a case where the diversity reception is carried out and combines a received signal and a noise signal in the noise cancellation process.

15 Claims, 7 Drawing Sheets

WIRELESS COMMUNICATION DEVICE

TECHNICAL FIELD

The present invention relates to a wireless communication device, and in particular, to a wireless communication device that communicates with use of a plurality of antennas.

BACKGROUND ART

In recent years, a noise cancellation technique using a noise pickup antenna has been developed as a technique for reducing noise of a received signal in a wireless communication device.

For example, Patent Literature 1 discloses a high-frequency device shown in FIG. 11. A high-frequency device 800 shown in FIG. 11 includes a plurality of noise pickup antennas (a noise pickup antenna 714 located in the vicinity of a noise source 742 and a noise pickup antenna 815 located in the vicinity of a noise source 842). A noise signal received by one of the plurality of noise pickup antennas is selected by a switch 824, and the noise signal is supplied to a cancel-signal generation circuit 725. A system controlling section 841 controls switching of the switch 824, and therefore the high-frequency device 800 can improve its reception quality.

CITATION LIST

Patent Literature

Patent Literature 1
Japanese Patent Application Publication, Tokukai, No. 2010-21682 A (Publication Date: Jan. 28, 2010)

SUMMARY OF INVENTION

Technical Problem

In the technique disclosed in Patent Literature 1, however, in a case where noise is generated at a particular frequency of each noise source, a noise cancellation section is unnecessary while the high-frequency device is communicating with use of other frequencies (in which noise is not generated).

The present invention has been made in view of the aforementioned problem, and an object of the present invention is to provide a technique for using a noise pickup antenna in a case where noise is generated and using a signal sending/receiving antenna in a case where noise is not generated in order to achieve a satisfactory communication status.

Solution to Problem

In order to attain the aforementioned object, a wireless communication device, in accordance with the present invention, for carrying out diversity reception and a noise cancellation process, the wireless communication device includes: a signal combining section, the signal combining section combining a plurality of received signals in a case where the diversity reception is carried out and combining a received signal and a noise signal in the noise cancellation process.

According to the above configuration, a signal combining section that is used in a noise cancellation process can be used for diversity reception when no noise is generated. Therefore, a whole noise cancellation section does not become unnecessary when no noise is generated. This makes it possible to achieve a satisfactory communication status with a compact device configuration.

Advantageous Effects of Invention

According to the present invention, a circuit for carrying out a noise cancellation process is partially used as a circuit for carrying out diversity communication. Therefore, a noise cancellation section can be effectively used. This makes it possible to achieve a satisfactory communication status with a compact device configuration.

DESCRIPTION OF EMBODIMENTS

[Embodiment 1]
A wireless communication device in accordance with one embodiment (Embodiment 1) of the present invention will be described below with reference to drawings. Note that the wireless communication device of Embodiment 1 is a portable or unportable wireless communication device, and examples of the portable or unportable wireless communication device encompass cellular phone terminals, portable information terminals, in-vehicle information terminals, in-vehicle telephone terminals, wireless communication devices, and stationary information terminals. However, the portable or unportable wireless communication devices are not limited to them, and therefore the present invention can be applied to general wireless communication devices. Further, contents of signals to be communicated are completely unlimited.

(Configuration of Device)

Figure 1:
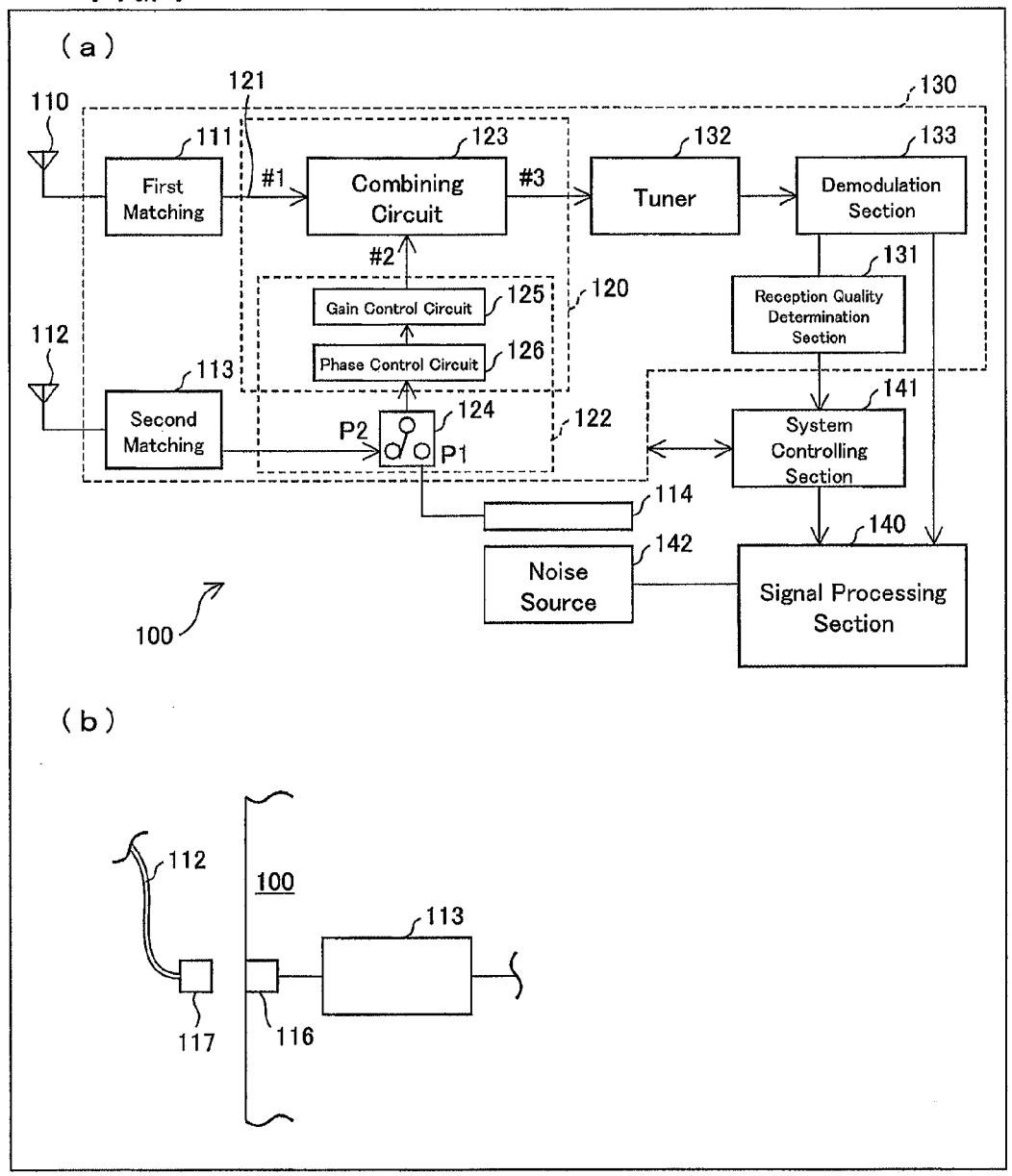
FIG. 1
(a) of FIG. 1 is a block diagram showing a schematic configuration of a wireless communication device in accordance with one embodiment of the present invention, and (b) of FIG. 1 is a schematic view showing an example configuration of a second signaling-antenna.

(a) of FIG. 1 is a block diagram showing a schematic configuration of a wireless communication device 100 of Embodiment 1. As shown in (a) of FIG. 1, the wireless communication device 100 includes a first antenna (first signal-reception antenna) 110, a first matching 111, a second antenna (second signal-reception antenna) 112, a second matching 113, a noise pickup antenna 114, a first signal-transmission section 121, a second signal-transmission section 122, a combining circuit (signal combining section) 123, a reception quality determination section (reception quality determination means, noise amount detection means) 131, a tuner 132, a demodulation section 133, a signal processing section 140, and a system controlling section (switch controlling means) 141.

Note that the second antenna 112 may be an external antenna that is removably provided to the wireless communication device 100. That is, as shown in (b) of FIG. 1, the wireless communication device 100 includes a connector 116 connected to the second matching 113, and the connector 116 may be connectable with an external antenna element (e.g., earphone antenna) or a connector 117 of, for example, a cradle including an external antenna element.

The wireless communication device 100 also includes a noise source 142. The noise source 142 is a section that radiates a radio wave which becomes noise for a signal to be received while the wireless communication device 100 is being operated, and could be a specific part of or a whole wireless communication device 100.

The second signal-transmission section 122 includes a switch (switching section) 124, a gain control circuit (adjustment section) 125, and a phase control circuit (phase adjustment section, adjustment section) 126. The first matching 111, the second matching 113, the first signal-transmission section 121, the second signal-transmission section 122, the combining circuit 123, the tuner 132, the demodulation section 133, and the reception quality determination section 131 constitute a reception processing section 130. Further, the combining circuit 123, the gain control circuit 125, and the phase control circuit 126 constitute a combining etc. processing section 120.

The gain control circuit 125 includes, for example, an amplifier (not shown) and an attenuator (not shown). The phase control circuit 126 includes, for example, a phase shifter (not shown). The gain control circuit 125 and the phase control circuit 126 can change at least one of amplitude and a phase of an inputted signal within a predetermined range.

The first matching 111 is a matching circuit for performing impedance matching of the first antenna 110 and the second matching 113 is a matching circuit for performing impedance matching of the second antenna 112. The first matching 111 and the second matching 113 may each include an amplifier such as an LNA (low noise amp) for amplifying a high-frequency signal. A signal received by the first antenna 110 is supplied to the first signal-transmission section 121. A signal received by the second antenna 112 is supplied to the second signal-transmission section 122.

The noise pickup antenna 114 is located in the vicinity of the noise source 142. A signal (noise) received by the noise pickup antenna 114 is supplied to the second signal-transmission section 122.

The first signal-transmission section 121 outputs a signal, which has been supplied from the first antenna 110, to the combining circuit 123. The first signal-transmission section 121 may include an amplifier such as an LNA for amplifying a high-frequency signal. The second signal-transmission section 122 outputs, to the combining circuit 123, at least one of the signal supplied from the second antenna 112 and the signal supplied from the noise pickup antenna 114 while at least one of amplitude and a phase of the signal supplied from the second antenna 112 or at least one of amplitude and a phase of the signal supplied from the noise pickup antenna 114 is being adjusted.

That is, a signal is supplied from the second antenna 112 to a port P1 of the switch 124 of the second signal-transmission section 122, and a signal is supplied from the noise pickup antenna 114 to a port P2. The switch 124 outputs a signal, which has been supplied via the port P1 or P2, to the phase control circuit 126. The phase control circuit 126 adjusts a phase of the signal thus supplied, and outputs the signal to the gain control circuit 125. The gain control circuit 125 adjusts amplitude of the signal thus supplied, and outputs the signal to the combining circuit 123. Note that switching of the switch 124, an adjustment amount of amplitude in the gain control circuit 125, and an adjustment amount of a phase in the phase control circuit 126 are controlled by the system controlling section 141.

Note that the gain control circuit 125 and the phase control circuit 126 may be replaced with each other. Specifically, a signal may be sent in such a manner that a signal supplied from the switch 124 is supplied to the gain control circuit 125, the signal supplied from the gain control circuit 125 is supplied to the phase control circuit 126, and the signal supplied from the phase control circuit 126 is supplied to the combining circuit 123.

Note that an operation (of the gain control circuit 125 and the phase control circuit 126) of the second signal-transmission section 122, that is, the description "at least one of amplitude and a phase of an inputted signal is adjusted to thereby be supplied to the combining circuit 123" in the present specification encompass the following operations: an operation in which both the gain control circuit 125 and the phase control circuit 126 output a signal thus supplied to the combining circuit 123 without adjusting either amplitude or a phase of the signal; an operation in which the gain control circuit 125 and the phase control circuit 126 scarcely output a signal to the combining circuit 123; and an operation in which an inputted signal is outputted or is not outputted to the combining circuit 123 while power sources of the gain control circuit 125 and the phase control circuit 126 are being off.

The combining circuit 123 combines a signal (#1) supplied from the first signal-transmission section 121 and a signal (#2) supplied from the second signal-transmission section 122 and outputs such a combined signal, as a signal (#3), to the tuner 132. The signal supplied from the combining circuit 123 is tuned by the tuner 132, demodulated by the demodulation section 133, and then supplied to the signal processing section 140.

The signal processing section 140 carries out a process, such as decoding, with respect to a signal. The reception quality determination section 131 determines reception qualities (such as a received power, a C/N (carrier to noise ratio), and an amount of noise) of a signal that has been demodulated by the demodulation section 133. The system controlling section 141 controls the switch 124, the gain control circuit 125, and the phase control circuit 126 on the basis of a result of the determination by the reception quality determination section 131. Detailed description of this will be described below.

(Combining of Signal)

In a case where the switch 124 is connected to the port P1, the wireless communication device 100 carries out a noise cancellation process by combining (A) a signal which has been supplied from the first antenna 110 with (B) a signal which has been supplied from the noise pickup antenna 114 and whose at least one of amplitude and a phase has been adjusted.

Figure 2:
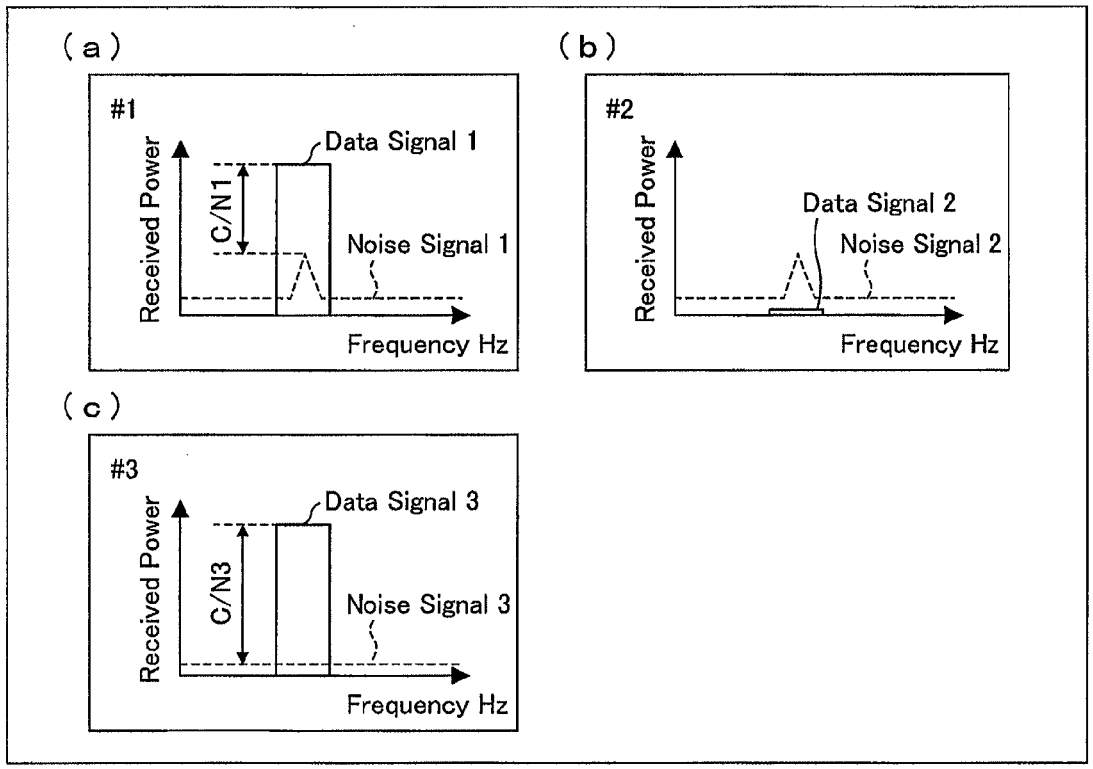
FIG. 2
FIG. 2 is a graph showing an example received power of a signal in each section in a case where a noise cancellation process is carried out in one embodiment of the present invention.

FIG. 2 is a graph showing, in a case where a noise cancellation process is carried out, an example received power of signals (#1 and #2) supplied to the combining circuit 123 and an example received power of a signal (#3) outputted from the combining circuit 123.

As shown in (a) of FIG. 2, a signal (#1) contains not only a data signal 1 but also a noise signal 1. Meanwhile, as shown in (b) of FIG. 2, a signal (#2) contains a noise signal 2 whose amplitude is substantially the same as that of the noise signal 1 of the signal (#1) and whose phase is substantially opposite to that of the noise signal 1. The combining circuit 123 combines the signal (#1) and the signal (#2) so that the noise signals 1 and 2 cancel with each other. This, as shown in (c) of FIG. 2, makes it possible to output a signal (#3) having a noise signal 3 whose received-power is reduced. As shown in FIG. 2, a carrier to noise ratio C/N3 of the signal (#3) is larger than a carrier to noise ratio C/N1 of the signal (#1). From this, it is found that receiver sensitivity is improved.

Further, in a case where the switch 124 is connected to the port P2, the wireless communication device 100 carries out diversity communication by combining a signal supplied from the first antenna 110 and a signal, supplied from the second antenna 112, whose amplitude and phase have been adjusted.

Figure 3:
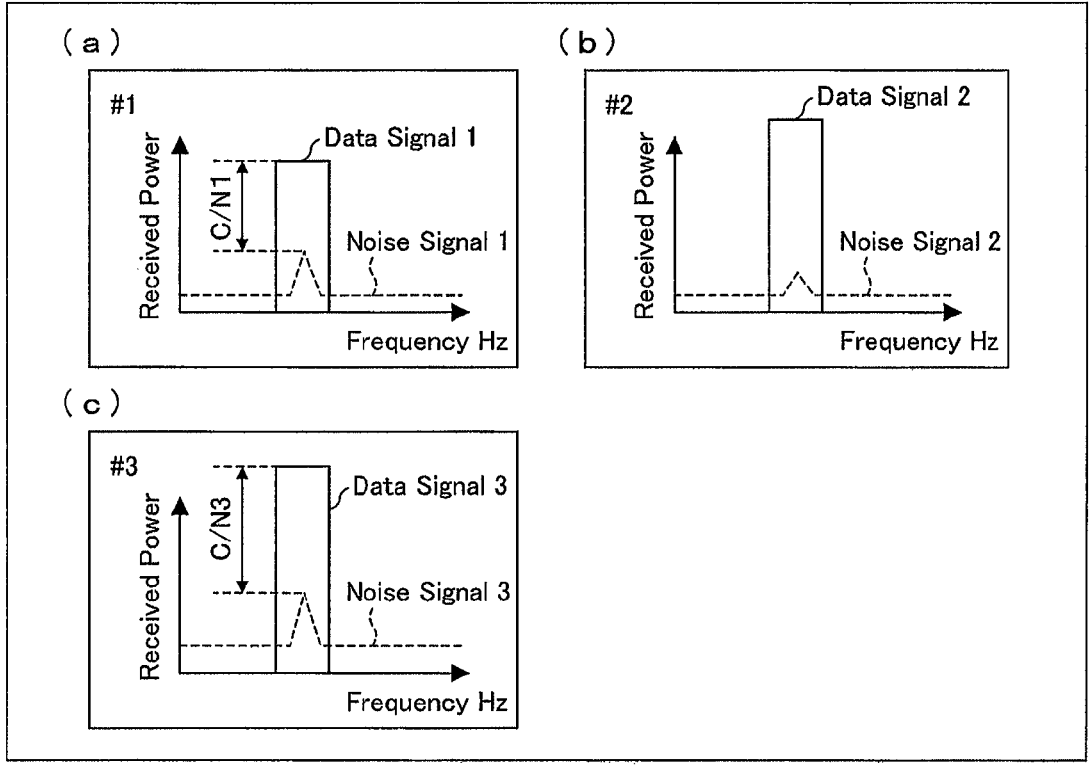
FIG. 3
FIG. 3 is a graph showing an example received power of a signal in each section in a case where diversity communication is carried out in one embodiment of the present invention.

FIG. 3 is a graph showing, in a case where diversity communication is carried out, an example received power of signals (#1 and #2) supplied to the combining circuit 123 and an example received power of a signal (#3) outputted from the combining circuit 123.

As shown in (a) of FIG. 3, the signal (#1) contains a data signal 1 and a noise signal 1. Further, as shown in (b) of FIG. 3, the signal (#2) contains a data signal 2 and a noise signal 2. The combining circuit 123 outputs a signal (#3) by combining the signal (#1) and the signal (#2). Here, the signal (#2) contains the data signal 2 and the noise signal 2. The data signal 2 has a phase substantially the same as that of the data signal 1 and has amplitude which has been appropriately adjusted. The combining circuit 123 combines the signal (#1) and the signal (#2), so that the data signals are added to each other. Therefore, a received power of the data signal 3 of the signal (#3) is improved. In this case, the noise signals are also added to each other, however, a phase relationship between the data signal 1 and the noise signal 1 of the signal (#1) is generally different from a phase relationship between the data signal 2 and the noise signal 2 of the signal (#2), so that a phase of the noise signal 1 and a phase of the noise signal 2 are different from each other even if the data signal 1 and the data signal 2 have a same phase. Therefore, as shown in (c) of FIG. 3, a received power of the noise signal 3 of the signal (#3) is not simply improved, and the combining circuit 123 can output a signal (#3) whose carrier to noise ratio C/N3 is large. In a case where a signal has a frequency in which a noise signal is not generated, only data signals are, as a matter of course, added to each other, so that a carrier to noise ratio C/N3 becomes effectively larger. This can improve receiver sensitivity.

As described above, in a case where a noise cancellation process is carried out, noise signals contained in a signal (#1) and a signal (#2) are combined so as to cancel with each other while having same amplitude and opposite phases. Meanwhile, in a case where diversity communication is carried out, data signals having a same phase, which are contained in the signal (#1) and the signal (#2), are combined in order to improve a received power. As described above, the combining etc. processing section 120 and the like are used to combine noise signals in a noise cancellation process and are also used to combine data signals in a diversity communication process, i.e., the same components are used to synthesize different signals in different process. However, it is found that, in both cases, the combining etc. processing section 120 and the like can improve receiver sensitivity.

Whether the wireless communication device 100 carries out a noise cancellation process or diversity communication may be determined on the basis of a standard (described below), and a process which improves a reception quality more effectively can be carried out according to circumstances. In the wireless communication device 100 of Embodiment 1, a circuit for use in a noise cancellation process can be partially used as a circuit for use in a diversity communication. Therefore, signals received by a plurality of signal reception antennas and a plurality of noise pickup antennas are appropriately combined according to circumstances, so that communication sensitivity is improved with a compact device configuration. This makes it possible to attain a preferable communication status.

(Control of Each Section)

The following description will discuss control of the switch 124, the gain control circuit 125, and the phase control circuit 126 by the system controlling section 141. Hereinafter, some variations of control by the system controlling section 141 will be described, however, the present invention is not limited thereto.

Figure 4:
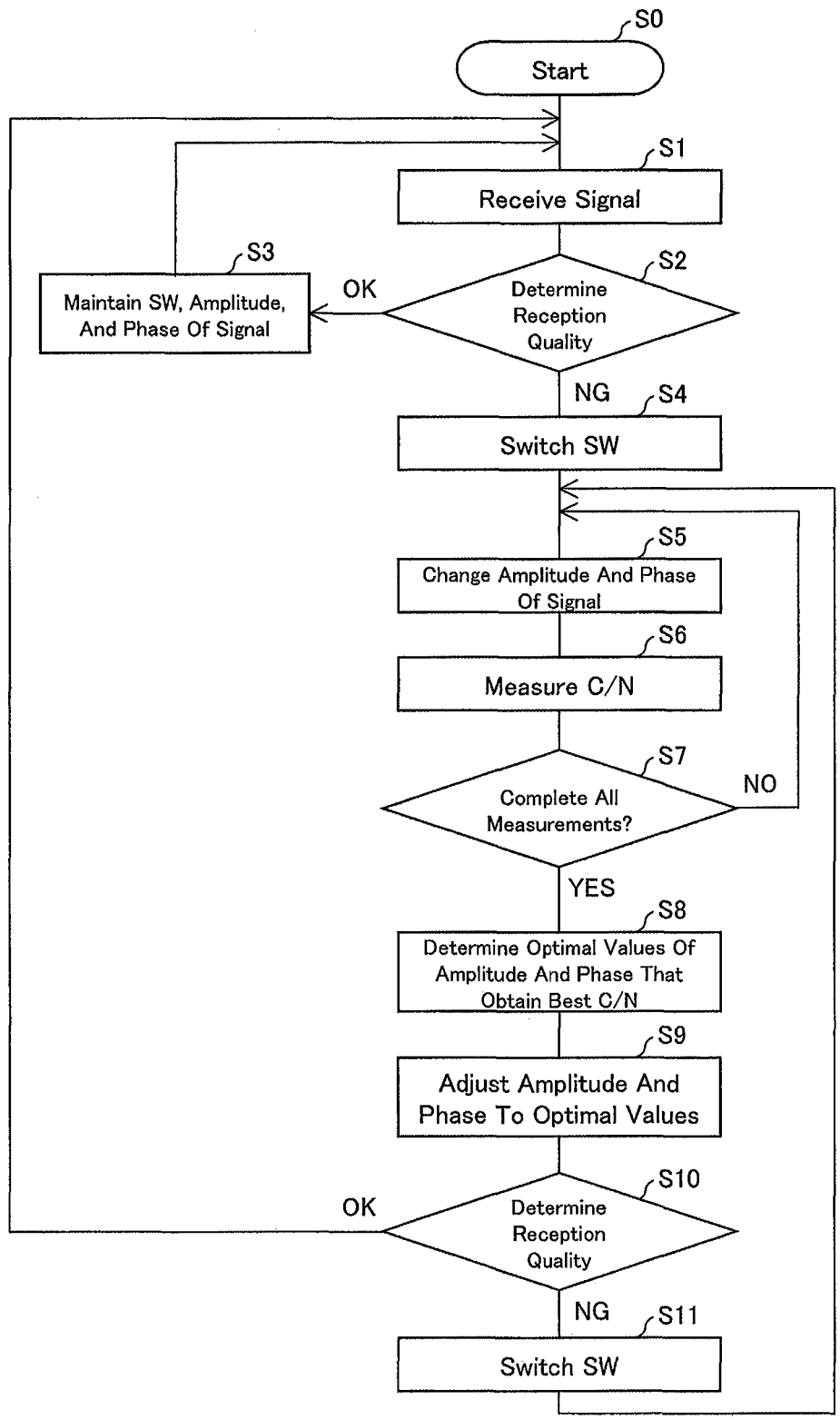
FIG. 4
FIG. 4 is a flowchart showing a process of carrying out switching of a switch on the basis of a reception quality in one embodiment of the present invention.

The following description will discuss a process in which the system controlling section 141 controls switching of the switch 124 on the basis of a reception quality. FIG. 4 is a flowchart showing a process of carrying out switching of the switch 124 on the basis of a reception quality. The process starts with the switch 124 having been connected to P0 or P1 (Step S0).

First, the reception processing section 130 and the signal processing section 140 each receive a data signal (Step S1). Then, the reception quality determination section 131 determines a reception quality of the data signal received in Step S1 (Step S2). In determination of the reception quality, for example, C/N can be taken as an indicator. However, the indicator is not limited thereto, and other indicators, such as a received power, a BER (bit error rate) and an amount of noise, may be used. The reception quality determination section 131 determines whether the reception quality is good (OK) or bad (NG) by comparing a particular indicator with, for example, a predetermined standard value.

In a case where it is determined in Step S2 that the reception quality is good, the system controlling section 141 does not switch the switch 124 and maintains an adjustment amount of amplitude in the gain control circuit 125 and an adjustment amount of phase in the phase control circuit 126 as they are (Step S3). Then the processing goes back to Step S1, and the reception processing section 130 and the signal processing section 140 keep receiving data signals.

Meanwhile, in a case where it is determined in Step S2 that the reception quality is bad, the system controlling section 141 controls the switching of the switch 124 (Step S4), and, in Steps S5 through S9, optimizes an adjustment amount of amplitude in the gain control circuit 125 and an adjustment amount of phase in the phase control circuit 126.

The system controlling section 141 firstly changes the adjustment amount of amplitude in the gain control circuit 125 and the adjustment amount of phase in the phase control circuit 126, and therefore changes amplitude and a phase of a signal (#2) supplied to the combining circuit 123 (Step S5). In this state, the reception quality determination section 131 measures C/N (Step S6). Thereafter, the system controlling section 141 repeats Steps S5 and S6 until the system controlling section 141 measures all correspondences, within a predetermined range, between adjustment amounts of amplitude and phase of the signal (#2) and C/N (Step S7).

After the measurement is finished, the system controlling section 141 determines, as optimal values, the adjustment amounts of amplitude, and phase that obtain the best C/N (Step S8), and controls the gain control circuit 125 and the phase control circuit 126 so that the adjustment amounts of amplitude and phase become optimal values (Step S9). In this way, optimization of the adjustment amount of amplitude in the gain control circuit 125 and the adjustment amount of phase in the phase control circuit 126 are completed by the system controlling section 141.

Note that, in the above description, there has been described, as an example, a case where a reception quality has been determined on the basis of C/N, however, other indicators may be used to determine a reception quality as described above.

Further, it is unnecessary to measure all the correspondences between the adjustment amounts and the C/N in Step S7, and, for example, Step 7 may be finished when any adjustment amount that excesses a predetermined C/N standard value is found, and then, in Step S8, the adjustment amount thus found may be determined as an optimal value.

The system controlling section 141 may calculate, instead of carrying out Steps S5 through S9, optimal values of the adjustment amounts that can increase C/N of a signal (#3) in accordance with other publicly-known optimization algorithms, and may control the gain control circuit 125 and the phase control circuit 126 on the basis of the optimal values thus calculated.

Subsequently, the reception quality determination section 131 determines the reception quality again (Step S10). In a case where the reception quality determination section 131 determines in Step S10 that the reception quality is good, the processing goes back to Step S1, and the reception processing section 130 and the signal processing section 140 keep receiving data signals. The reception quality determination section 131 determines in Step S10 that the reception quality is bad, the system controlling section 141 controls the switching of the switch 124 (Step S11) and optimizes again an adjustment amount of amplitude in the gain control circuit 125 and an adjustment amount of phase in the phase control circuit 126 (Steps S5 through S9).

Note that, in a case where the reception quality determination section 131 determines a plurality of times, in Step S10, that the reception quality is bad and Steps S5 through S11 are repeatedly carried out, a switching process of the switch 124 based on a reception quality may be stopped at a predetermined timing.

By carrying out the above process, the wireless communication device 100 can carry out a process (a noise cancellation process or a diversity communication) which can improve a reception quality more. It is therefore possible to achieve a preferable communication status according to circumstances.

Figure 5:
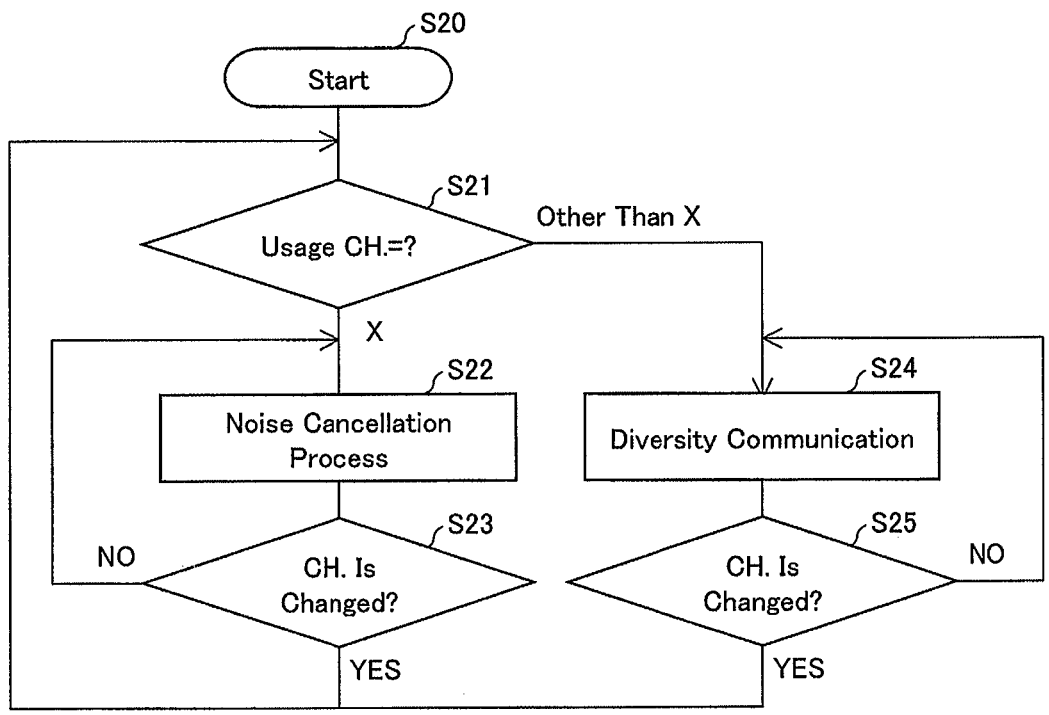
FIG. 5
FIG. 5 is a flowchart showing a process of carrying out switching of a switch depending on which channel is used in one embodiment of the present invention.

The following description will discuss a process in which the system controlling section 141 controls the switching of the switch depending on which channel is used (usage frequency band). FIG. 5 is a flowchart showing a process of carrying out switching of a switch depending on which channel is used. The process starts with a channel to be used having been selected (Step S20).

Figure 6:
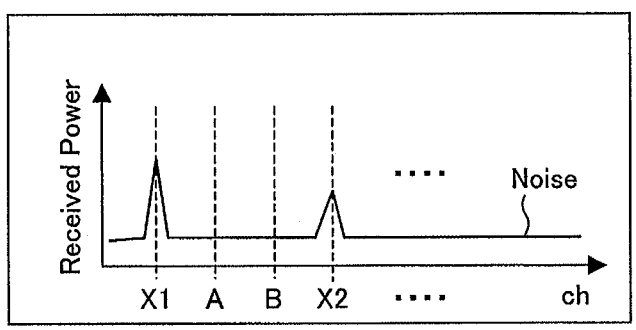
FIG. 6
FIG. 6 is a graph showing an example of an amount of noise in each channel in one embodiment of the present invention.

Note that the following description will be discussed on the assumption that, for each channel usable in the wireless communication device 100, an amount of noise when the wireless communication device 100 receives a signal with use of the each channel is measured in advance. FIG. 6 shows one example of measurement results. In the example of FIG. 6, an amount of noise is large when a channel is "X" (X1 or X2). The following description will be discussed under this condition.

First, the system controlling section 141 determines whether or not a channel (frequency band) to be used in the reception processing section 130 is a particular channel ("X") which increases an amount of noise (Step S21).

In a case where it is determined in Step S21 that the channel is "X", the system controlling section 141 causes the reception processing section 130 to execute a noise cancellation process (Step S22). That is, the switch 124 is connected to the port P1. In this case, the system controlling section 141 may optimize, as in Steps S5 through S9, an adjustment amount of amplitude in the gain control circuit 125 and an adjustment amount of phase in the phase control circuit 126. Alternatively, optimal values of adjustment amounts of amplitude and phase with respect to noise when a channel "X" is used are measured in advance and are stored in the system controlling section 141, and the system controlling section 141 may read out the optimal values thus stored in advance and optimize the adjustment amount of amplitude in the gain control circuit 125 and the adjustment amount of phase in the phase control circuit 126.

Then, Step S22 is repeated until the usage channel is changed or the communication is finished (Step S23). In a case where the usage channel is changed, the processing goes back to Step S21.

Meanwhile, in a case where it is determined in Step S21 that the usage channel is other than "X", the system controlling section 141 causes the reception processing section 130 to carry out diversity communication because it has been found in advance that an amount of noise is not large (Step S24). That is, the switch 124 is connected to the port P2. In this case, the system controlling section 141 may optimize an adjustment amount of amplitude in the gain control circuit 125 and an adjustment amount of phase in the phase control circuit 126 as in Steps S5 through S9. Then, Step S24 is repeated until the usage channel is changed or the communication is finished (Step S25). In a case where the usage channel is changed, the processing goes back to Step S21.

The wireless communication device 100 carries out the above processes. Therefore, in a case where there is used a channel whose amount of noise is expected to be large, a noise cancellation process is carried out to reduce the amount of noise, which results in preferably improving communication sensitivity, meanwhile, in a case where there is used another channel whose amount of noise does not become large, diversity communication is carried out, which results in improving communication sensitivity. This makes it possible to achieve a preferable communication status according to circumstances.

Figure 7:
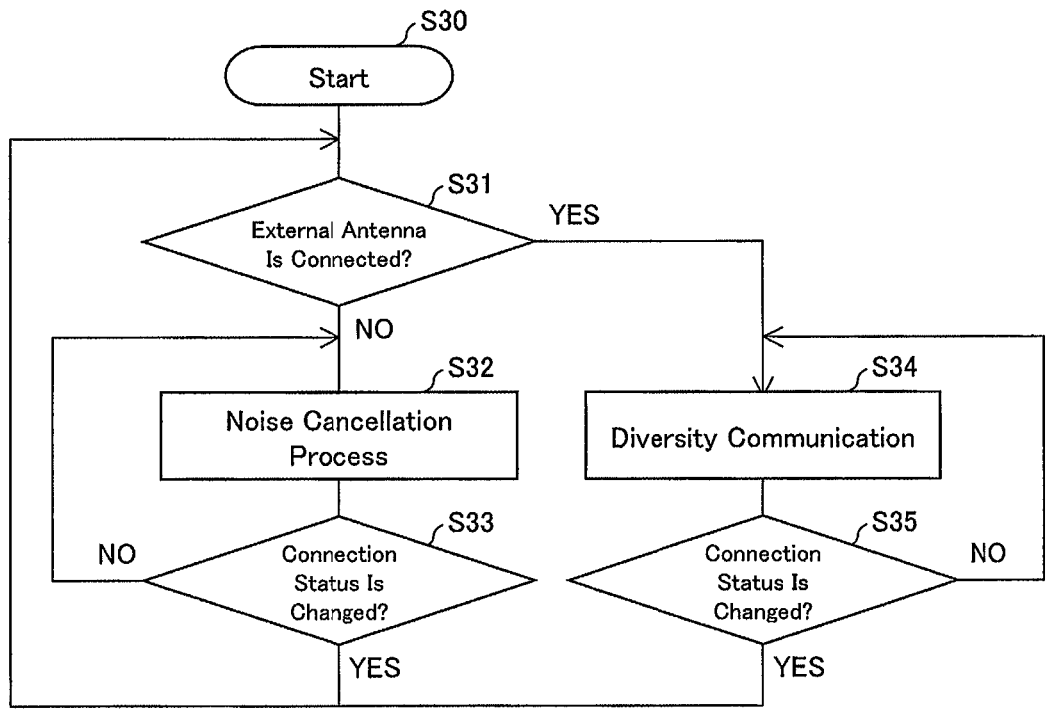
FIG. 7
FIG. 7 is a flowchart showing a process of carrying out switching of a switch on the basis of a connection status of an external antenna in one embodiment of the present invention.

The following description will discuss a process in which the system controlling section 141 controls the switching of the switch on the basis of a connection status of an external antenna. FIG. 7 is a flowchart showing a process of carrying out switching of a switch on the basis of a connection status of an external antenna. The process starts with the system controlling section 141 having been ready to detect a connection status of an external antenna (Step S30).

Note that the following description will be discussed on the assumption that (I) the second antenna 112 is an external antenna which is connected to the connector 116 of the wireless communication device 100 and (II) the system controlling section 141 can detect whether or not the second antenna 112 is connected to the connector 116. The system controlling section 141 detects a connection status of the second antenna 112 by, for example, a physical mechanism (not shown) or by measuring a reflected power supplied from the connector 116.

First, the system controlling section 141 determines whether or not the second antenna 112 is connected to the connector 116 (Step S31).

In a case where it is determined in Step S31 that the second antenna 112 is not connected to the connector 116, the system controlling section 141 causes the reception processing section 130 to carry out a noise cancellation process (Step S32). That is, the switch 124 is connected to the port P1. In this case, the system controlling section 141 may optimize an adjustment amount of amplitude in the gain control circuit 125 and an adjustment amount of phase in the phase control circuit 126 as in Steps S5 through S9. Then, Step S32 is repeated until there is detected a change in connection status of the second antenna 112 or the communication is finished (Step S33). In a case where there is detected a change in connection status, the processing goes back to Step S31.

Meanwhile, in a case where it is determined in Step S31 that the second antenna 112 is connected to the connector 116, the system controlling section 141 causes the reception processing section 130 to carry out diversity communication (Step S34). That is, the switch 124 is connected to the port P2. In this case, the system controlling section 141 may optimize an adjustment amount of amplitude in the gain control circuit 125 and an adjustment amount of phase in the phase control circuit 126 as in Steps S5 through S9. Then, Step S34 is repeated until the usage channel is changed or the communication is finished (Step S35). In a case where there is detected a change in connection status of the second antenna 112, the processing goes back to Step S31.

The wireless communication device 100 carries out the above processes, so that, in a case where the second antenna 112 is connected and diversity communication is ready to be carried out, the diversity communication is carried out, meanwhile, in a case where the second antenna is not connected, a noise cancellation process is carried out with use of the noise pickup antenna 114 which is provided in the wireless communication device 100. It is therefore possible to achieve a preferable communication status according to circumstances.

Figure 8:
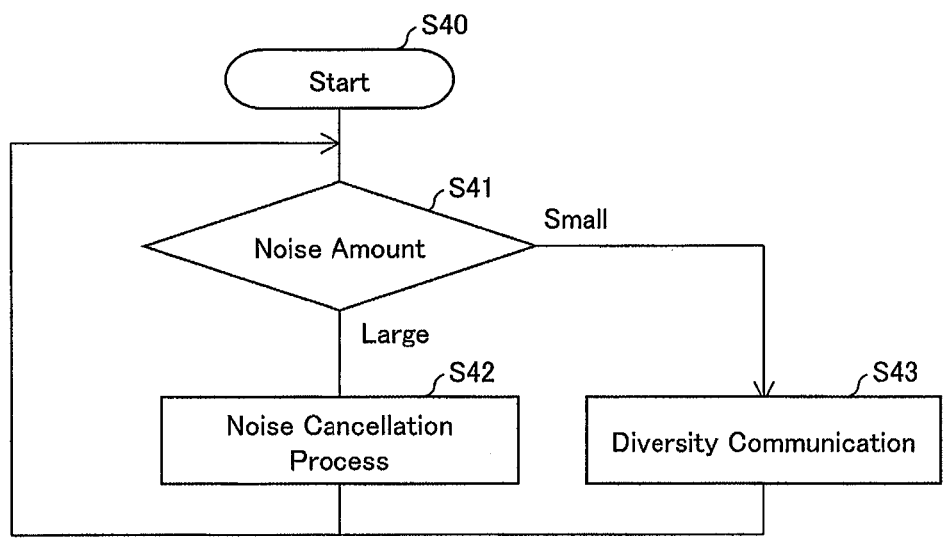
FIG. 8
FIG. 8 is a flowchart showing a process of carrying out switching of a switch on the basis of an amount of noise in one embodiment of the present invention.

The following description will discuss a process in which the system controlling section 141 changes a switch on the basis of an amount of noise. FIG. 8 is a flowchart showing a process of carrying out switching of a switch on the basis of an amount of noise. The process starts when the reception quality determination section 131 is ready to detect an amount of noise (Step S40).

Note that, as a method for detecting an amount of noise with use of the reception quality determination section 131, there may be employed, for example, a method in which an amount of noise is sensed on the basis of an electric power of a noise signal received by the noise pickup antenna 114, or other methods may be employed.

First, the reception quality determination section 131 compares the amount of noise thus detected with a predetermined standard value (Step S41).

In a case where it is determined in Step S41 that the amount of noise excesses the predetermined standard value, the system controlling section 141 causes the reception processing section 130 to execute a noise cancellation process (Step S42). That is, the switch 124 is connected to the port P1. In this case, the system controlling section 141 may optimize an adjustment amount of amplitude in the gain control circuit 125 and an adjustment amount of phase in the phase control circuit 126 as in Steps S5 through S9. Then, the processing goes back to Step S41 at a timing appropriately set, and the reception quality determination section 131 determines the amount of noise again.

Meanwhile, in a case where it is determined in Step S41 that the amount of noise is the predetermined standard value or less, the system controlling section 141 causes the reception processing section 130 to execute diversity communication (Step S43). That is, the switch 124 is connected to the port P2. In this case, the system controlling section 141 may optimize an adjustment amount of amplitude in the gain control circuit 125 and an adjustment amount of phase in the phase control circuit 126 as in Steps S5 through S9. Then, the processing goes back to Step S41 at a timing appropriately set, and the reception quality determination section 131 determines the amount of noise again.

The wireless communication device 100 carries out the above processes, so that, in a case where an amount of noise is large, a noise cancellation process is carried out, meanwhile, in a case where an amount of noise is small, diversity communication is carried out. This makes it possible to achieve a preferable communication status according to circumstances.

From the above, a system controlling section 100 controls the switch 124, the gain control circuit 125, and the phase control circuit 126 on the basis of various indicators. This makes it possible to achieve a preferable communication status according to circumstances. Note that the system controlling section 100 may control the switch 124, the gain control circuit 125, and the phase control circuit 126 on the basis of a plurality of indicators. For example, the system controlling section 100 may carry out two or more processes of the processes shown in FIGS. 4, 5, 7, and 8.

(Modified Example)

The above description has discussed a configuration having one second antenna and one noise pickup antenna, however, the present embodiment is not limited thereto. Therefore, a plurality of second antennas and a plurality of noise pickup antennas may be used.

In this case, for example, the switch 124 may be configured to (i) have ports corresponding to the total sum of the second antennas and the noise pickup antennas and (ii) output any one of the signals that have been supplied to all ports, via the antennas gain control circuit 125 and the phase control circuit 126, to the combining circuit 123.

Alternatively, the second signal-transmission section 122 may include a plurality of switches, gain control circuits, and phase control circuits. That is, the ports corresponding to the total sum of the second antennas and the noise pickup antennas are allotted to the plurality of switches, respectively, and signals are selected in each switch. At least one of amplitude and phase of the signals thus selected in the switches is adjusted by a gain control circuit and a phase control circuit, each of which is connected to each switch, and is then supplied to the combining circuit 123 to thereby be combined.

According to Embodiment 1 as described above, even if the wireless communication device 100 includes a plurality of second antennas and a plurality of noise pickup antennas, it is possible to improve receiver sensitivity, with a compact device configuration, by appropriately combining signals received by a plurality of reception antennas and signals received by a plurality of noise pickup antennas, because a circuit for use in a noise cancellation process can be partially used as a circuit for use in diversity communication. This makes it possible to achieve a preferable a communication status.

[Embodiment 2]

Figure 9:
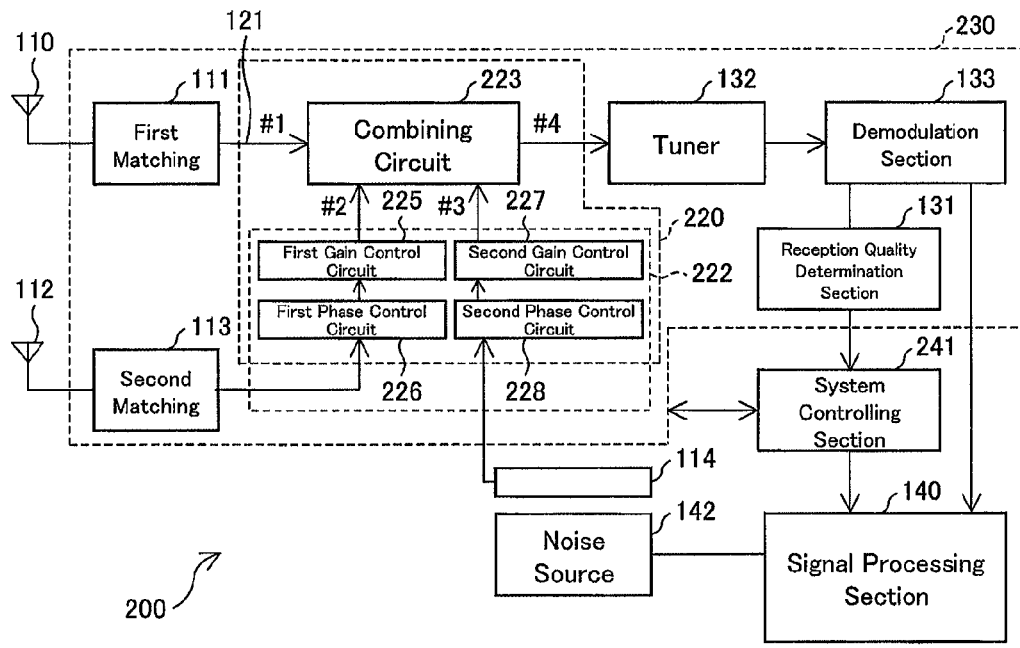
FIG. 9
FIG. 9 is a block diagram showing a schematic configuration of a wireless communication device in accordance with another embodiment of the present invention.

FIG. 9 is a block diagram showing a schematic configuration of a wireless communication device 200 in accordance with another embodiment (Embodiment 2) of the present invention. In the wireless communication device 200, members having the like functions as the members of the wireless communication device 100 are denoted by the like symbols and the description thereof is omitted.

The wireless communication device 200 is different from the wireless communication device 100 in a configuration of a reception processing section 230 and an operation of a system controlling section 241. More specifically, in the reception processing section 230, a second signal transmission section 222 adjusts at least one of amplitude and a phase of a signal supplied from the second antenna 112 and at least one of amplitude and a phase of a signal supplied from the noise pickup antenna 114, and outputs the signals to a combining circuit (signal combining section) 223. The combining circuit 223 combines a signal (#1) supplied from the first signal-transmission section 121 and signals (#2 and #3) supplied from the second signal transmission section 222, and outputs a combined signal as a signal (#4) to the tuner 132.

Therefore, the second signal transmission section 222 includes: a first phase control circuit (phase adjustment section, adjustment section) 226 to which a signal is supplied from the second antenna 112; a first gain control circuit (adjustment section) 225 to which a signal is supplied from the first phase control circuit 226; a second phase control circuit (phase adjustment section, adjustment section) 228 to which a signal is supplied from the noise pickup antenna 114; and a second gain control circuit (adjustment section) 227 to which a signal is supplied from the second phase control circuit 228. A signal (#2) is supplied from the first gain control circuit 225 to the combining circuit 223, and a signal (#3) is supplied from the second gain control circuit 227 to the combining circuit 223. A signal from the second antenna 112 and a signal from the noise pickup antenna 114 are supplied to a combining etc. processing section 220. Note that the first gain control circuit 225 and the first phase control circuit 226 may be replaced with each other and the second gain control circuit 227 and the first phase control circuit 228 may be replaced with each other.

The wireless communication device 200 carries out diversity communication and a noise cancellation process by combining (i) a signal supplied from the first antenna 110, (ii) a signal, supplied from the second antenna 112, whose at least one of amplitude and phase has been adjusted, and (iii) a signal, supplied from the noise pickup antenna 114, whose at least one of amplitude and phase has been adjusted.

Figure 10:
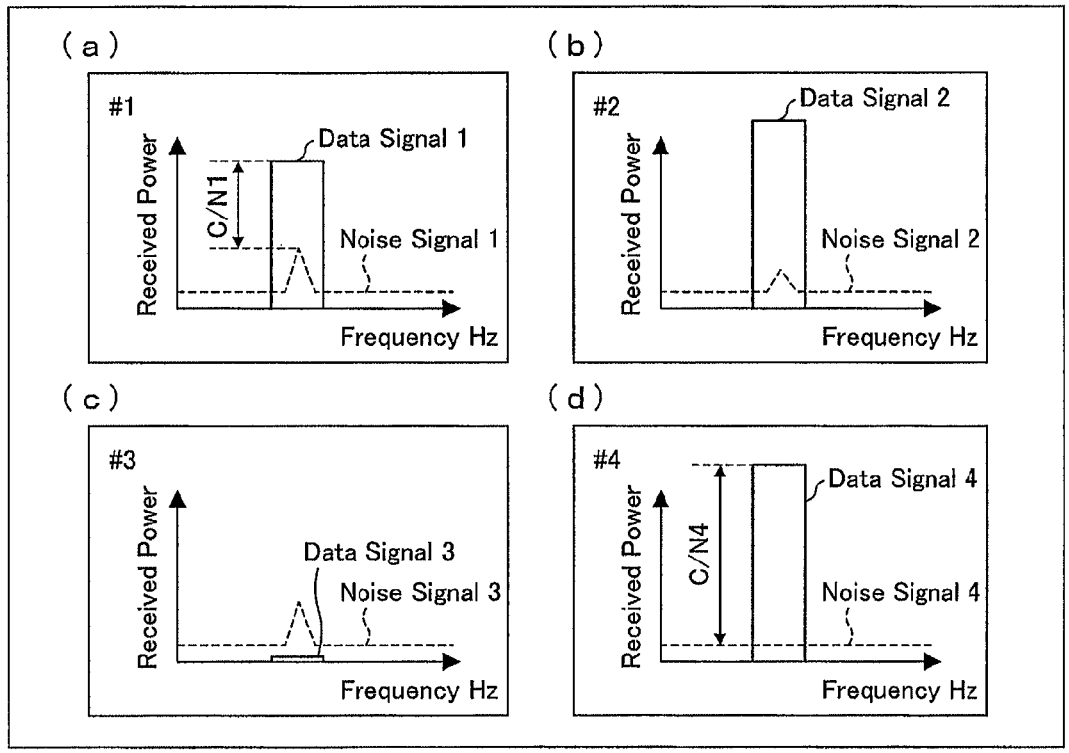
FIG. 10
FIG. 10 is a graph showing an example received power of a signal in each section in a case where a noise cancellation process is carried out in another embodiment of the present invention.
Figure 11:
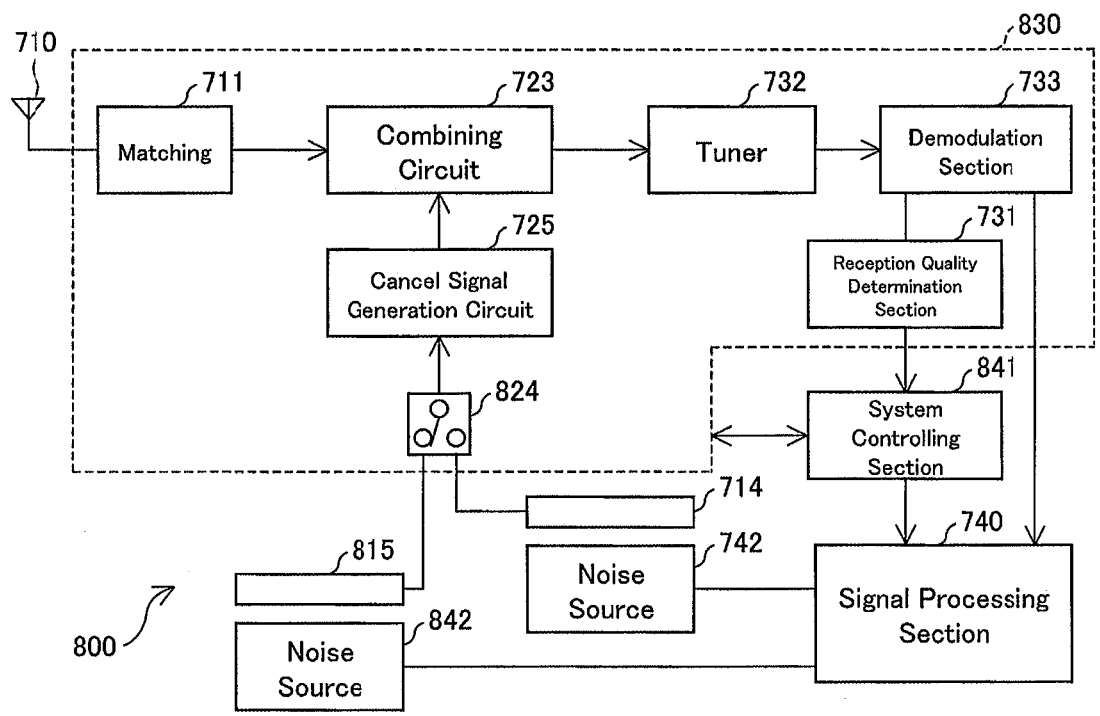
FIG. 11
FIG. 11 is a block diagram showing a schematic configuration of a wireless communication device in accordance with a conventional art.

FIG. 10 is a graph showing example received powers of signals (#1, #2, and #3) supplied to the combining circuit 223 and a signal (#4) outputted from the combine circuit 123 in a case where a noise cancellation process is carried out.

As shown in (a) of FIG. 10, a signal (#1) contains a data signal 1 and a noise signal 1. As shown in (b) of FIG. 10, a signal (#2) contains a data signal 2 and a noise signal 2. As shown in (c) of FIG. 10, the signal (#3) contains substantially a noise signal only. The combine circuit 223 combines the signal (#1), the signal (#2), and the signal (#3), and therefore outputs the signal (#4). Here, as shown in (d) of FIG. 10, amplitude and a phase of the signal (#2) is adjusted so that a carrier to noise ratio C/N4 of the signal (#4) is larger than a carrier to noise ratio C/N1 of signal (#1), so that the combining circuit 223 can output the signal (#4) whose carrier to noise ratio C/N4 is large. Further, amplitude and a phase of the signal (#3) are adjusted so that a noise signal is canceled in the signal (#4), and therefore the carrier to noise ratio C/N4 is larger than the carrier to noise ratio C/N1 of signal (#1). Thus, as shown in (d) of FIG. 10, the combining circuit 223 can output the large signal (#4) whose noise signal has been reduced. This makes it possible to improve receiver sensitivity.

As described above, the system controlling section 241 can improve receiver sensitivity in the wireless communication device 200 by controlling adjustment amounts of amplitude and a phase of the first gain control circuit 225, those of the first phase control circuit 226, those of the second gain control circuit 227, and those of the second the second phase control circuit 228. The system controlling section 241 may control the first gain control circuit 225, the first phase control circuit 226, the second gain control circuit 227, and the second phase control circuit 228 in accordance with, for example, the processes of Steps S5 through S9 shown in FIG. 4. Alternatively, the system controlling section 241 may control the first gain control circuit 225, the first phase control circuit 226, the second gain control circuit 227, and the second phase control circuit 228 by (i) calculating optimal values of the adjustment amounts with use of other publicly-known optimization algorithms so that C/N of a signal (#4) becomes large and (ii) adjusting amplitudes and phases in accordance with the optimal values thus calculated.

As described above, in the wireless communication device 200 of Embodiment 2, a circuit for use in a noise cancellation process can be partially used as a circuit for use in diversity communication. It is therefore possible to appropriately combine, with a compact device configuration, signals received by a plurality of signal reception antennas and signals received by a plurality of noise pickup antennas. This makes it possible to preferably improve receiver sensitivity.

(Modified Example)

Also in the Embodiment 2, a plurality of second antennas and a plurality of noise pickup antennas may be used. In this case, for example, the second signal-transmission section 122 may be configured to further include another gain control circuit and another phase control circuit, and all signals supplied from the plurality of second antenna and the plurality of noise pickup antennas may be configured to be supplied to the combining circuit 223 via different gain control circuits and different phase control circuits.

Further, Embodiment 1 and Embodiment 2 may be incorporated with each other. Specifically, the second signal transmission section may include a switch, select a signal to be supplied to a combining circuit by carrying out the switching of the switch, and output a plurality of signals to the combining circuit. In Embodiment 2, for example, the switch may be configured to be connected to the second phase control circuit 228 and to receive signals from a plurality of noise pickup antennas. According to the configuration, the second signal transmission section appropriately selects signals, which have been supplied from the plurality of noise pickup antennas, on the basis of a predetermined standard, and causes the signals to be supplied to the combining circuit 223. This makes it possible to improve receiver sensitivity more. Signals to be supplied to the switch is not limited to signals supplied from a plurality of noise pickup antennas, and may be signals supplied from a plurality of signal reception antennas or signals supplied from both the plurality of noise pickup antennas and the plurality of signal reception antennas.

As described above, a signal received by one or more second signal-reception antenna(s) and a signal received by one or more noise pickup antenna(s) are supplied to the second signal transmission section, and at least one of a phase and amplitude of at least one of signals thus supplied is adjusted, and then the at least one of the signals is outputted to a combining circuit. In a case where the second signal transmission section has the above configuration, a circuit for use in a noise cancellation process can be partially used as a circuit for use in diversity communication. It is therefore possible to appropriately combine, with a compact device configuration, signals supplied from a plurality of signal reception antennas and signals supplied from a plurality of noise pickup antennas. This makes it possible to carry out a preferable communication.

Further, in Embodiment 1 and Embodiment 2, the wireless communication devices 100 and 200 carry out diversity communication with use of a plurality of signal reception antennas (the first antenna 110 and the second antenna 112), however, the present invention is not limited thereto. In the wireless communication devices 100 and 200, a plurality of signal reception antennas may be used as adaptive array antennas, or may be used to achieve a technique for using other antennas.

(Program and Recording Medium)

The system controlling sections 141 and 241 may be configured by hardware with use of a logic circuit formed on an integrated circuit (IC chip) or can alternatively be realized by software with use of a CPU (Central Processing Unit) as follows.

In the latter case, the system controlling sections 141 and 241 includes a CPU which carries out a command of a control program for realizing functions, a ROM (read only memory) which stores the program, a RAM (random access memory) which develops the program, and a storage apparatus (recording medium), such as a memory, which stores the program and various kinds of data. Further, the object of the present invention can be also realized in such a manner that: a recording medium is provided to the system controlling sections 141 and 241, which recording medium has stored program codes (execution mode program, intermediate code program, and source program) (serving as software for realizing the aforementioned functions) of a control program in the system controlling sections 141 and 241 so as to be readable by a computer; and the program codes stored in the recording medium are read out and carried out by the computer (or CPU or MPU).

Examples of the recording medium encompass: tapes such as a magnetic tape and a cassette tape; disks such as magnetic disks (e.g., floppy (registered trademark) disk and a hard disk) and optical disks (e.g., CD-ROM, MO, MD, DVD, and CD-R); cards such as IC cards (including memory cards) and optical cards; semiconductor memories (e.g., mask ROM, EPROM, EEPROM, and flash ROM); and logic circuits etc. such as PLDs (programmable logic devices) and FPGAs (field programmable gate arrays).

Further, the system controlling sections 141 and 241 may be configured to be connected to a communication network, and the program codes may be supplied via the communication network. The communication network is not particularly limited, provided that the communication network can transmit the program codes. Examples of the communication network encompass the Internet, intranet, extranet, LAN, ISDN, VAN, CATV communication network, virtual private network, telephone network, mobile communication network, and satellite communication network. In addition, a transmission medium constituting the communication network is not limited to a transmission medium having a particular configuration or a particular type of transmission medium, provided that the transmission medium can transmit the program codes. Examples of the transmission medium encompass: wired transmission media such as IEEE 1394, USB, power-line carrier, cable TV line, telephone line, and ADSL (Asymmetric Digital Subscriber Line); and wireless transmission media such as infrared rays (e.g., IrDA and remote controller), Bluetooth (registered trademark), 802.11 wireless, HDR, NFC (Near Field Communication), DLNA (Digital Living Network Alliance), cell-phone network, satellite line, and digital terrestrial network.

(Summary)

As described above, a wireless communication device, in accordance with the present invention, for carrying out diversity reception and a noise cancellation process, the wireless communication device includes: a signal combining section, the signal combining section combining a plurality of received signals in a case where the diversity reception is carried out and combining a received signal and a noise signal in the noise cancellation process.

According to the above configuration, even if noise is not generated, the signal combining section for use in the noise cancellation process can be used for carrying out the diversity reception. Therefore, not all components of the noise cancellation section are unnecessary even if noise is not generated. This makes it possible to achieve a preferable communication status with a compact device configuration.

It is preferable that the wireless communication device of the present invention include a phase adjustment section, the phase adjustment section adjusting a phase(s) of a part of the plurality of received signals in a case where the diversity reception is carried out and adjusting a phase of the noise signal in the noise cancellation process.

According to the above configuration, even if noise is not generated, the phase adjustment section for use in the noise cancellation process can be used for carrying out the diversity reception. It is therefore possible to further reduce components which are unnecessary while noise is not generated. This makes it possible to achieve a preferable communication status with a more compact device configuration.

In the wireless communication device of the present invention, it is preferable that, in a case where the diversity reception is carried out, the phase adjustment section adjusts the phase(s) of the part of the plurality of received signals to be identical with a phase(s) of a received signal(s) to be combined with the part of the plurality of received signals in the signal combining section, and, in the noise cancellation process, the phase adjustment section adjusts a phase of the noise signal to be identical with a phase of a received signal to be combined with the noise signal in the signal combining section.

The above configuration makes it possible to preferably carry out the diversity reception and the noise cancellation process.

It is preferable that the wireless communication device of the present invention include a switching section for carrying out switching of a signal to be supplied to the phase adjustment section, wherein, in a case where the switching section carries out the switching so that the part of the plurality of received signals is supplied to the phase adjustment section, the phase adjustment section adjusts the phase(s) of the part of the plurality of received signals, which part has been supplied to the phase adjustment section, to be identical with a phase(s) of a received signal(s) to be combined with the part of the plurality of received signals in the signal combining section, and, in a case where the switching section carries out the switching so that the noise signal is supplied to the phase adjustment section, the phase adjustment section adjusts the phase of the noise signal, which has been supplied to the phase adjustment section, to be opposite to a phase of a received signal to be combined with the noise signal in the signal combining section.

According to the above configuration, when a signal to be supplied to the phase adjustment section is switched, the phase adjustment section adjusts a phase depending upon a kind of such a switched input signal. This makes it possible to preferably adjust the phase and preferably carry out the diversity reception and the noise cancellation process.

The wireless communication device of the present invention may include a first signal-reception antenna; a noise pickup antenna; a first signal transmission section for outputting, to the signal combining section, a received signal received by the first signal-reception antenna; and a second signal transmission section for receiving (A) a received signal received by a second signal-reception antenna, which received signal is different from that received by the first signal-reception antenna, and (B) the noise signal received by the noise pickup antenna, adjusting at least one of a phase and amplitude of at least one df the received signal and the noise signal thus received, and outputting the received signal and the noise signal to the signal combining section, wherein: diversity combining is carried out with use of at least the received signal received by the second signal-reception antenna; and the noise cancellation process is carried out with use of at least the noise signal received by the noise pickup antenna.

According to the above configuration, the signal combining section can appropriately combine (A) a signal received by another signal reception antenna or another noise pickup antenna, whose amplitude and phase has been adjusted, and (B) a signal received by the first signal-reception antenna. Therefore, even if the signal combining section functions as a part of a circuit for carrying out the noise cancellation process and also functions as a part of a circuit for carrying out a communication with use of a plurality of antennas. Thus, according to the above configuration, the part of the circuit for carrying out the noise cancellation process is used as the part of the circuit for carrying out the communication with use of a plurality of antennas. This makes it possible to achieve a preferable communication status with a compact device configuration in consideration of both noise reduction and communication with use of a plurality of antennas.

In the wireless communication device of the present invention, the second signal-reception antenna may be a removable external antenna.

According to the above configuration, the second signal-reception antenna is a removable external antenna such as an earphone antenna. It is therefore possible that the second signal-reception antenna obtains more satisfactory antenna characteristics than that of the first signal-reception antenna which is usually provided in the wireless communication device, because the second signal-reception antenna can prevent influence of the wireless communication device serving as a ground. Further, the second signal-reception antenna is apart from a noise source of the wireless communication device. This makes it possible to reduce an amount of noise received by the second signal-reception antenna less than that received by the first signal-reception antenna. Thus, according to the above configuration, the antenna characteristics of the second signal-reception antenna are improved. It is therefore possible to achieve a more preferable diversity communication.

It is preferable that the wireless communication device of the present invention further include a tuner for tuning at least the received signal received by the first signal-reception antenna, wherein a signal combined in the signal combining section is supplied to the tuner.

According to the above configuration, a tuner is used in common between a circuit for use in the noise cancellation process and a circuit for carrying out a communication with use of a plurality of antennas. This makes it possible to achieve a preferable communication status with a compact device configuration.

In the wireless communication device of the present invention, it is preferable that: the second signal transmission section include a switch; and a signal to be supplied to the signal combining section be selected from the received signal and the noise signal, which have been supplied to the second signal transmission section, by carrying out the switching of the switch.

According to the above configuration, the signal combining section only needs to combine a signal supplied from the first signal transmission section and a signal selected by the switch. This makes it possible to achieve a preferable communication status with a more compact device configuration.

In the wireless communication device of the present invention, it is preferable that: the second signal transmission section include an adjustment section for adjusting at least one of phase and amplitude of a signal to be supplied to the signal combining section; and the switch connect the adjustment section to one of the second signal-reception antenna and the noise pickup antenna.

According to the above configuration, an adjustment section is used in common between a circuit for use in the noise cancellation process and a circuit for carrying out a communication with use of a plurality of antennas. This makes it possible to achieve a preferable communication status with a more compact device configuration.

It is preferable that the wireless communication device of the present invention include switch controlling means for carrying out the switching of the switch.

The wireless communication device may further include reception quality determination means for determining a reception quality, wherein the switch controlling means controls the switching of the switch in accordance with a determination result of the reception quality determination means.

According to the above configuration, it is possible to carry out a process having a high reception quality among the noise cancellation process and the communication with use of a plurality of antennas. This makes it possible to achieve a preferable communication status according to circumstances.

In the wireless communication device, the switch controlling means may control the switching of the switch in accordance with a frequency band in which the wireless communication device carries out a wireless communication.

According to the above configuration, in a case where there is used a frequency band whose amount of noise is expected to be large, a noise cancellation process is carried out to reduce the amount of noise, which results in preferably improving communication sensitivity, meanwhile, in a case where there is used another frequency band whose amount of noise does not become large, a communication with use of a plurality of antennas is carried out, which results in improving communication sensitivity. This makes it possible to achieve a preferable communication status according to circumstances.

In the wireless communication device, the second signal-reception antenna may be an external antenna; and the switch controlling means may control the switching of the switch so that, in a case where the second signal-reception antenna is connected to the wireless communication device, the received signal received by the second signal-reception antenna is supplied to the signal combining section.

According to the above configuration, in a case where the second signaling-antenna is connected and a communication with use of a plurality of antennas is workable, the communication with use of a plurality of antennas is carried out, meanwhile, in a case where the second signaling-antenna is not connected, the noise cancellation process is carried out with use of the noise pickup antenna. This makes it possible to achieve a preferable communication status according to circumstances.

The wireless communication device may include noise amount detection means for detecting an amount of noise in the wireless communication device, wherein the switch controlling means controls the switching of the switch so that, in a case where the amount of noise detected by the noise amount detection means excesses a standard value, the noise signal received by the noise pickup antenna is supplied to the signal combining section, and, in a case where the amount of noise is equal to or less than the standard value, the received signal received by the second signal-reception antenna is supplied to the signal combining section.

According to the above configuration, in a case where an amount of noise is large, the noise cancellation process is carried out, meanwhile, in a case where an amount of noise is small, the communication with use of the plurality of antennas is carried out. This makes it possible to achieve a preferable communication status according to circumstances.

In the wireless communication device of the present invention, the noise pickup antenna may include a plurality of noise pickup antennas and the second signal-reception antenna may include a plurality of second signal-reception antennas.

According to the above configuration, it is possible to carry out the noise cancellation process and the communication with use of the plurality of antennas more preferably.

Further, the present invention encompasses a program for operating a wireless communication device in accordance with the present invention and causing a computer to have functions of sections of the wireless communication device and a computer readable recording medium in which the program is stored.

The present invention is not limited to the description of the embodiments above, and can be modified in numerous ways by a skilled person as long as such modification falls within the scope of the claims. An embodiment derived from a proper combining of technical means disclosed in different embodiments is also encompassed in the technical scope of the present invention.

INDUSTRIAL APPLICABILITY

The present invention can be used in a manufacturing field of wireless communication devices.

REFERENCE SIGNS LIST 100, 200 wireless communication device
110 first antenna (first signal-reception antenna)
111 first matching
112 second antenna (second signal-reception antenna)
113 second matching
114 noise pickup antenna
120, 220 combining tec. processing section
121 first signal transmission section
122, 222 second signal transmission section
123, 223 combining circuit (signal combining section)
124 switch (switching section)
125 gain control circuit (adjustment section)
126 phase control circuit (phase adjustment section, adjustment section)
225 first gain control circuit (adjustment section)
226 first phase control circuit (phase adjustment section, adjustment section)
227 second gain control circuit (adjustment section)
228 second phase control circuit (phase adjustment section, adjustment section)
130, 230 reception processing section
131 reception quality determination section (reception quality determination means, noise amount detection means)
132 tuner
133 demodulation section
140 signal processing section
141, 241 system controlling section (switch controlling means)
142 noise source

The invention claimed is:

1. A wireless communication device for carrying out diversity reception and a noise cancellation process, the wireless communication device comprising:
a first signal-reception antenna;
a second signal-reception antenna which is different from the first signal-reception antenna;
a noise pickup antenna; and
a signal combining section,
the signal combining section combining a received signal received by the first signal-reception antenna and a received signal received by a second signal-reception antenna in a case where the diversity reception is carried out, and combining the received signal received by the first signal-reception antenna and a noise signal received by the noise pickup antenna in the noise cancellation process.

2. The wireless communication device as set forth in claim 1, further comprising
a phase adjustment section,
the phase adjustment section adjusting a phase(s) of the received signal received by the second signal-reception antenna in a case where the diversity reception is carried out and adjusting a phase of the noise signal in the noise cancellation process.

3. The wireless communication device as set forth in claim 2, wherein, in a case where the diversity reception is carried out, the phase adjustment section adjusts the phase(s) of the received signal received by the second signal-reception antenna to be identical with a phase(s) of a received signal(s) to be combined with the received signal received by the second signal-reception antenna in the signal combining section, and, in the noise cancellation process, the phase adjustment section adjusts the phase of the noise signal to be opposite to a phase of a received signal to be combined with the noise signal in the signal combining section.

4. A wireless communication device for carrying out diversity reception and a noise cancellation process, the wireless communication device comprising:

a signal combining section, the signal combining section combining a plurality of received signals in a case where the diversity reception is carried out, and combining a received signal and a noise signal in the noise cancellation process;

a phase adjustment section, the phase adjustment section adjusting a phase(s) of a part of the plurality of received signals in a case where the diversity reception is carried out and adjusting a phase of the noise signal in the noise cancellation process; and a switching section for carrying out switching of a signal to be supplied to the phase adjustment section, wherein, in a case where the switching section carries out the switching so that the part of the plurality of received signals is supplied to the phase adjustment section, the phase adjustment section adjusts the phase(s) of the part of the plurality of received signals, which part has been supplied to the phase adjustment section, to be identical with a phase(s) of a received signal(s) to be combined with the part of the plurality of received signals in the signal combining section, and, in a case where the switching section carries out the switching so that the noise signal is supplied to the phase adjustment section, the phase adjustment section adjusts the phase of the noise signal, which has been supplied to the phase adjustment section, to be opposite to a phase of a received signal to be combined with the noise signal in the signal combining section.

5. A wireless communication device for carrying out diversity reception and a noise cancellation process, the wireless communication device comprising:

a signal combining section, the signal combining section combining a plurality of received signals in a case where the diversity reception is carried out, and combining a received signal and a noise signal in the noise cancellation process;

a first signal-reception antenna;

a noise pickup antenna;

a first signal transmission section for outputting, to the signal combining section, a received signal received by the first signal-reception antenna; and a second signal transmission section for receiving (A) a received signal received by a second signal-reception antenna which is different from the first signal-reception antenna, and (B) the noise signal received by the noise pickup antenna, adjusting at least one of a phase and amplitude of at least one of the received signal and the noise signal thus received, and outputting the at least one of the received signal and the noise signal to the signal combining section, wherein:

diversity combining is carried out with use of at least the received signal received by the second signal-reception antenna; and the noise cancellation process is carried out with use of at least the noise signal received by the noise pickup antenna.

6. The wireless communication device as set forth in claim 5, wherein the second signal-reception antenna is a removable external antenna.

7. The wireless communication device as set forth in claim 5, further comprising a tuner for tuning at least the received signal received by the first signal-reception antenna, wherein a signal combined in the signal combining section is supplied to the tuner.

8. The wireless communication device as set forth in claim 5, wherein:

the second signal transmission section includes a switch; and a signal to be supplied to the signal combining section is selected from the received signal and the noise signal, which have been supplied to the second signal transmission section, by carrying out switching of the switch.

9. The wireless communication device as set forth in claim 8, wherein:

the second signal transmission section includes an adjustment section for adjusting at least one of a phase and amplitude of a signal to be supplied to the signal combining section; and the switch connects the adjustment section to one of the second signal-reception antenna and the noise pickup antenna.

10. The wireless communication device as set forth in claim 8, further comprising switch controlling means for carrying out the switching of the switch.

11. The wireless communication device as set forth in claim 10, further comprising reception quality determination means for determining a reception quality, wherein the switch controlling means controls the switching of the switch in accordance with a determination result of the reception quality determination means.

12. The wireless communication device as set forth in claim 10, wherein the switch controlling means controls the switching of the switch in accordance with a frequency band in which the wireless communication device carries out a wireless communication.

13. The wireless communication device as set forth in claim 10, wherein:

the second signal-reception antenna is an external antenna; and the switch controlling means controls the switching of the switch so that, in a case where the second signal-reception antenna is connected to the wireless communication device, the received signal received by the second signal-reception antenna is supplied to the signal combining section.

14. The wireless communication device as set forth in claim 10, further comprising noise amount detection means for detecting an amount of noise in the wireless communication device, wherein the switch controlling means controls the switching of the switch so that, in a case where the amount of noise detected by the noise amount detection means excesses a standard value, the noise signal received by the noise pickup antenna is supplied to the signal combining section, and, in a case where the amount of noise is equal to or less than the standard value, the received signal received by the second signal-reception antenna is supplied to the signal combining section.

15. The wireless communication device as set forth in claim 5, wherein the noise pickup antenna includes a plurality of noise pickup antennas or the second signal-reception antenna includes a plurality of second signal-reception antennas.

* * * * *